Oct. 19, 1965 C. Y. J. BOUTEILLE 3,212,878
PHYSICAL OR CHEMICAL TREATMENT OF FINE POWDERY MATERIALS
HAVING A CONTROLLED GRANULOMETRY
Filed July 30, 1962
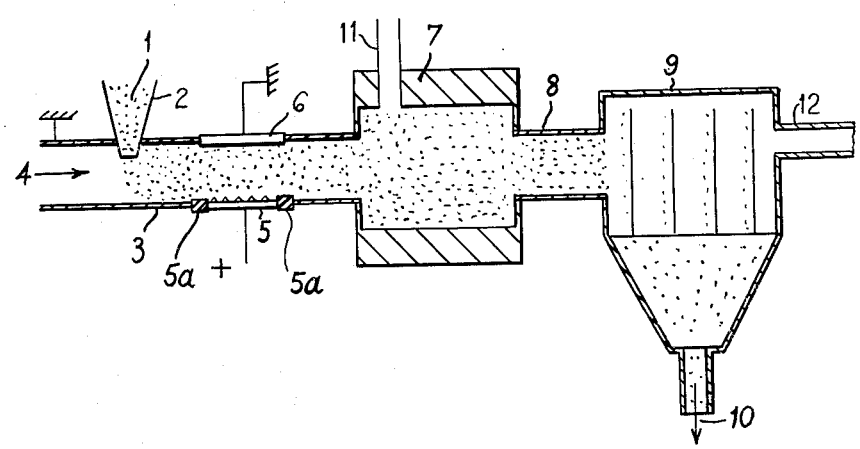
Inventor
C. Y. J. Bouteille
By
Attorneys

United States Patent Office 3,212,878
Patented Oct. 19, 1965

3,212,878
PHYSICAL OR CHEMICAL TREATMENT OF
FINE POWDERY MATERIALS HAVING A CONTROLLED GRANULOMETRY
Charles Yves Joseph Bouteille, 156 Ave. de Chabeuil a
Valence, Drome, France
Filed July 30, 1962, Ser. No. 213,504
Claims priority, application France, Aug. 4, 1961, 613
10 Claims. (Cl. 75—9)

The present invention has for an object an improved method for physically or mechanically treating certain fine powdery materials, in particular powders of less than one micron and which are electrically conductive, this treatment enabling the chemical composition or the shape of the grains to be varied while retaining a homothetical granulometric distribution of the initial pulverulent raw material.

In particular, the invention enables chemical or physical changes to be made in this initial material so that the materials obtained after treatment meet various practical requirements better than before, and so that the products into which they are incorporated are more effective in their application.

The method according to the invention consists in using pulverulent materials having electrical conductivity, such as the powder of certain oxides, sulphides, carbides, borides and silicides of metals and metal alloys; in suspending the powder in a fluid which is not electrically conductive, in particular a gas; in ionizing the gas so as electrically to charge each grain of powder and in treating the powder thus charged in a suitable enclosure while it is suspended in the gas and while it has a constant, predetermined, granulometric distribution.

The present method not only covers the method hereinbefore described but also covers the powders obtained by the said method by way of new industrial products and the apparatus for carrying out the said method.

In a more detailed manner, the initial pulverulent material having electrical conductivity should have a granulometric distribution, during the treatment, which is suitable for the application envisaged. For example, when a porous structure is to be obtained, as for a filter, a pulverulent material is selected, all the grains of which have approximately the same mass.

However, if it is wished to obtain an air or watertight structure or one having high mechanical characteristics, the grain sizes of the pulverulent material are distributed, for example, according to a curve showing the maximum filler density.

In order to treat this selected pulverulent material, the invention provides for the treatment thereof in a gas which does not conduct electricity, measures being taken so that each grain is separated from those adjacent thereto, the final treatment, therefore, being effected simultaneously and separately on each grain. In order to ensure this preliminary separation of the grains, the invention provides for the ionization of the gas containing the initial powder in suspension, for example by passing the powder and gas mixture in front of electrostatic discharge members such as combs or electrodes so that each grain of the conductive material carries electric charges. The charge of each grain repels those of the adjacent grains and thus ensures the constant separation of the grains in respect of one another. In this manner a constant granulometric distribution of the initial material is maintained during the entire treatment.

In fact, it is noted that the agglomerates caused by the fineness of the powder are disassociated by the electrostatic pressure acting on their surface, that the free electrons which are not used are easily collected by an auxiliary metal electrode, that at this point the pulverulent material is in a stable suspension, of the electrostatic mist or aerosol type, and consequently that each grain is well separated from those adjacent thereto. With a very fine powder, the sedimentation speed is very low, as Stokes' law shows, and is approximately one micron or less per second. The gas carrying the isolated electrically charged particles in suspension may be transported without difficulty into the various treatment enclosures.

The nature of the non-electrically conductive gas is selected in view of the application envisaged:

With a reducing gas, and during the passage through a heated enclosure, a powder may be reduced to a lower state of oxidation, for example an oxide may be reduced to the metallic state. The use for this purpose of hydrogen, an electrical conductor, is avoided in favour of, for example, carbon monoxide.

With an oxidizing gas and during the passage through a heated enclosure, for example, a sulphide powder is changed to an oxide powder by roasting. Each sulphide grain yields one oxide grain since the abovementioned electrostatic suspension enables each grain to be treated separately.

It will be noted that the temperature rise caused by heating or the exothermic reaction used for the treatment may enable the powder grain in question to become plastic or to be superficially or totally melted, i.e. the powder grain which may have any shape at the beginning may be more or less transformed, the sharp edges may become blunted and the grain may even be transformed into a globule, this being very favourable if, for example, it is intended to produce a filtering structure with this material. During heating, the thermionic emission may have more or less discharged the particle: it is to be noted that this does not constitute a drawback regardless of whether sufficient charge remains to maintain the suspension, because the temperature increase has not been too high or too lengthy, or because the sedimentation speed, by Stokes' law, enables sufficient cooling of the grain to take place, for a very fine powder, before it becomes welded to the adjacent grain.

It is desirable for the electrostatic charge on each grain to be sufficiently low for the electrical field on the surface of the grain to be lower than the disruptive field of the gas used, or the electrical charges on the grains may disappear.

It is useful to provide an auxiliary electrode, the purpose of which is to collect and evacuate any possible excess of electrical charges emanating from the ionizing element.

When the powder is charged, as hereinbefore described, the carrier gas and the powder may easily be transported into a suitable enclosure where the powder undergoes the required chemical or physical treatment.

After treatment, the transformed grains and the carrier gas may be cooled, and finally the grains are separated from the gas in a separator, for example an electrostatic precipitator.

In order that the method of the invention, as hereinbefore described, may be well understood, an embodiment thereof will be given, although it will be obvious that this is in no way limiting.

It will be supposed that the material used is a cupronickel mixed sulphide, for example a Monel metal sulphide, reduced to the pulverulent state by mechanical crushing and from which is selected a very narrow granulometric range approximately equal to the diameter of the grain it is wished to treat. This powder is first suspended in a current of inert gas, for example nitrogen. This powder-laden gas passes through a zone in which the electrostatic discharge combs or electrodes ionize it. The electrical charges are distributed partially on the surface of the grains and on the agglomerates of the conductive powder. The superficial electrostatic pressure causes the agglomerates to break up, and the excess charges are collected by an auxiliary electrode. Each grain of powder is then in stable suspension and is well distributed by the electrostatic repulsion caused by the superficial charges carried, and each grain is well isolated from those adjacent thereto.

The electro-stable mist of Monel metal sulphide is then conveyed into an enclosure wherein (in the case in question) it receives an addition of oxygen or air. The temperature is raised, either by heating the nitrogen before mixing with the oxygen, or by heating the oxygen before mixing with the nitrogen, or by a combination of the two measures, or by heating the gas after mixing. This temperature increase causes the sulphide to oxidize and in view of its fineness, it is roasted almost instantly. The maximum temperature obtained on the grain may cause it to reach incandescence since the reaction is exothermic and the grain is very small. The proportion of oxygen in the nitrogen enables this maximum temperature to be controlled and, consequently, enables the grains to be globulized to a greater or lesser extent according to the use envisaged for them.

Cooling is very rapid in view of the enormous specific surface of the pulverulent material and it may be controlled by diluting the suspension in the carrier fluid. Consequently at this point a powder of globulized Monel metal oxide is being conveyed, each oxide grain deriving from one single sulphide grain. It is noted that this electrically insulating oxide powder has a very distinct tendency to reconstitute into agglomerates, but this is unimportant as the grains will not weld because the powder is cold.

The treatment is completed by separating the product conveyed by the carrier gas, for example, by precipitation by means of an electrostatic precipitator. If the granulometric distribution of the initial sulphide corresponded to a certain curve of approximately the average value of 0.1 micron, it will be noted that the granulometric distribution of the final oxide corresponds to a homothetical curve approximate to an average value slightly below 0.09 micron.

Other powders may be similarly treated, for example the mixed iron-cobalt sulphide may be roasted or magnetic iron oxide may be reduced, or a metal powder may be nitrided or otherwise treated, while still remaining within the scope of the invention.

It will therefore be seen from the above that the method of the invention provides considerable practical advantages, among which may be particularly cited:

That of dissociating the agglomerates of the starting powder by initial superficial electrostatic pressure, and of eliminating the re-forming of such agglomerates during the treatment;

That of easily conveying a stable mist or suspension caused by superficial electrostatic charge kept on the surface of the grains which are separated from one another;

That of treating each grain independently of those adjacent thereto and consequently retaining a constant granulometric distribution which is judiciously selected as a function of the object intended; and That of rounding off the possible roughnesses of the grain and of globulizing the powder to a greater or lesser extent by regulating the maximum temperature obtained during the treatment.

By way of example, an apparatus suitable for carrying out the invention will now be described with reference to the accompanying drawing, which shows the apparatus in diagrammatic form, in longitudinal section.

The initial powder 1 to be treated is supplied from a hopper 2 from which it passes into a conduit 3, for example by gravity, wherein a current of electrically non-conductive gas 4 is present, the nature of this current depending on the chemical or physical treatment which the powder is to undergo.

The initial powder which is thus suspended in the gas subsequently passes therewith between two electrostatic discharge electrodes 5, 6; the electrode 5 being electrically insulated from the conduit 3 by insulating members 5a, and having a positive voltage in relation to the other electrode 6, which may be grounded. The electrical voltage source (not illustrated) may be of any suitable known type. The gas and powder are thus charged, and the grains of powder are thus separated from one another. The gas and powder subsequently pass into an enclosure 7 which may be heated by any required means so as to cause the grains to undergo the required transformation: for example, oxidation, reduction, or globulization. A conduit 11 permits the introduction of air or oxygen into the enclosure 7.

After treatment, the gas and the treated powder pass, if necessary, into a cooling enclosure or conduit 8 and through a separator device 9, for example an electrostatic precipitator, thereby enabling the treated powder to be collected at the outlet therefrom in the direction of the arrow 10, while the gas passes out through a conduit 12.

Finally, it should be understood that the present invention is not limited to the embodiments mentioned or described in the description by way of non-limiting examples, and it encompasses all the modifications which may use equivalent means in order to obtain analogous results by applying the general features of the method covered by the present invention, the invention being limited only by the claims.

I claim:

1. A method of treating grains of an electrically conductive material having a predetermined granulometric distribution, which comprises the steps of suspending grains of a starting material in an electrically non-conductive fluid, said grains being all of the same nature and having a predetermined granulometric distribution, electrostatically charging each of the grains with a charge of the same sign in order to set the grains apart from each other, transporting the charged and set-apart grains to a treatment zone, subjecting the grains to a treatment while in said treatment zone, and separating said grains from said fluid.

2. A method of treating grains of an electrically conductive material having a predetermined granulometric distribution, which comprises the steps of suspending grains of a starting material in an electrically non-conductive gas, said grains being all of the same nature and having a predetermined granulometric distribution, electrostatically charging each of the grains with a charge of the same sign in order to set the grains apart from each other, transporting the charged and set-apart grains to a treatment zone, subjecting the grains to a treament while in said treatment zone, and separating said grains from said gas.

3. A method of treating grains of an electrically conductive material having a predetermined granulometric distribution, which comprises the steps of suspending grains of a starting material in an electrically non-conductive gas, said grains being all of the same nature and having a predetermined granulometric distribution, ionizing the electrically non-conductive gas and electrostatically charging each of the grains with a charge of the same sign in order to set the grains apart from each other, transporting the charged and set-apart grains to a treatment zone, subjecting the grains to a treatment while in said treatment zone, and separating said grains from said gas.

4. A method of treating grains of an electrically conductive material having a predetermined granulometric distribution, which comprises the steps of suspending grains of a starting material in an electrically non-conductive gas, said grains being all of the same nature and having a predetermined granulometric distribution, electrostatically charging each of the grains with a charge of the same sign in order to set the grains apart from each other by passing the gas and entrained grains between electrostatic discharge members, transporting the charged and set-apart grains to a treatment zone, subjecting the grains to a treatment while in said treatment zone, and separating said grains from said gas.

5. Apparatus for preparing homogeneous grains of electrically conductive material, said apparatus comprising, in combination, means for entraining grains having a predetermined granulometric distribution in an electrically non-conductive fluid, means for electrostatically charging each of said grains with a charge of the same sign, a treatment zone including means for altering at least one property of said grains, and separator means for separating said grains from said fluid.

6. Apparatus for preparing homogeneous grains of electrically conductive material, said apparatus comprising, in combination, means for entraining grains having a predetermined granulometric distribution in an electrically non-conductive gas, means for electrostatically charging each of said grains with a charge of the same sign, a heated treatment zone including means for altering at least one property of said grains, means for cooling said grains after alteration of said at least one property, and separator means for separating said grains from said gas.

7. Apparatus for preparing homogeneous grains of electrically conductive material, said apparatus comprising, in combination, means for entraining grains having a predetermined granulometric distribution in an electrically non-conductive gas, means for ionizing said gas and electrostatically charging each of said grains with a charge of the same sign, a treatment zone including means for altering at least one property of said grains, and separator means for separating said grains from said gas.

8. Apparatus for preparing homogeneous grains of electrically conductive material, said apparatus comprising, in combination, means for entraining grains having a predetermined granulometric distribution in an electrically non-conductive gas, electrostatic discharge members for ionizing said gas and electrostatically charging each of the grains with a charge of the same sign, a treatment zone including means for altering at least one property of said grains, and separator means for separating said grains from said gas.

9. Apparatus for preparing homogeneous grains of electrically conductive material, said apparatus comprising, in combination, means for entraining grains having a predetermined granulometric distribution in an electrically non-conductive gas, means for electrostatically charging each of said grains with a charge of the same sign, a heated treatment zone including means for altering at least one property of said grains, means for cooling said grains after alteration of said at least one property, and separator means for separating said grains from said gas.

10. Apparatus for preparing homogeneous grains of electrically conductive material, said apparatus comprising, in combination, means for entraining grains having a predetermined granulometric distribution in an electrically non-conductive gas means for electrostatically charging each of said grains with a charge of the same sign, a treatment zone including means for altering at least one property of said grains, and an electrostatic precipitator for separating said grains from said gas.

References Cited by the Examiner

UNITED STATES PATENTS

| 2,283,964 | 5/42 | Wyckoff | 209—127 |
| 2,839,189 | 6/58 | Johnson | 209—127 |
| 2,896,263 | 7/59 | Frederick et al. | 75—3 |

OTHER REFERENCES

Frass et al.: Industrial and Engineering Chemistry, vol. 32, No. 5, pp. 600–604.

BENJAMIN HENKIN, *Primary Examiner.*

DAVID L. RECK, *Examiner.*